(12) United States Patent
Rastogi et al.

(10) Patent No.: US 10,356,654 B2
(45) Date of Patent: *Jul. 16, 2019

(54) FAIR DISTRIBUTION OF RADIO RESOURCES BETWEEN GUARANTEED BIT RATE (GBR) AND NON-GBR DATA BEARERS

(71) Applicant: Aricent Holdings Luxembourg S.A.R.L., Luxembourg (LU)

(72) Inventors: Mayank Kumar Rastogi, Haryana (IN); Rajiv Gupta, Haryana (IN); Rajesh Jain, Haryana (IN); Tauheed Ahmed, Haryana (IN)

(73) Assignee: Aricent Holdings Luxembourg S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,125

(22) Filed: Sep. 8, 2017

(65) Prior Publication Data

US 2018/0014221 A1 Jan. 11, 2018

Related U.S. Application Data

(63) Continuation of application No. 14/541,585, filed on Nov. 14, 2014, now Pat. No. 9,788,233.

(51) Int. Cl.
*H04W 28/02* (2009.01)
*H04W 72/12* (2009.01)
(Continued)

(52) U.S. Cl.
CPC ... *H04W 28/0257* (2013.01); *H04W 72/1247* (2013.01); *H04L 47/30* (2013.01);
(Continued)

(58) Field of Classification Search
CPC ............. H04W 28/02; H04W 28/0257; H04W 72/1247; H04L 47/30; H04L 47/6275
See application file for complete search history.

(56) References Cited

U.S. PATENT DOCUMENTS 9,788,233 B2 * 10/2017 Rastogi ............. H04W 72/1247
2010/0135229 A1 * 6/2010 Lohr ................. H04W 72/1284
370/329
(Continued)

*Primary Examiner* — Wei Zhao
(74) *Attorney, Agent, or Firm* — Harrington & Smith

(57) ABSTRACT

User equipments (UEs) may be scheduled by determining relative priorities of data radio bearers (DRBs), each DRB associated with a respective UE. A limit is established dividing radio resources available for allocation in the cell during a scheduling period into at least a first limited portion and a second remaining portion. According to the determined relative priorities: a) up to the first limited portion of the radio resources are allocated to only the DRBs that have a guaranteed bit rate (GBR), and thereafter b) the second remaining portion of the radio resources are allocated to only the DRBs which have not been fully allocated from the first limited portion. Schedules indicating this allocation are transmitted to the respective UEs. In carrier aggregation where each carrier aggregated cells has a respective plurality of DRBs, relative priorities for each respective plurality of DRBs are determined for each carrier aggregated cell.

20 Claims, 6 Drawing Sheets

(51) Int. Cl.
  *H04L 12/865* (2013.01)
  *H04L 12/867* (2013.01)
  *H04L 12/835* (2013.01)

(52) U.S. Cl.
  CPC ........ *H04L 47/629* (2013.01); *H04L 47/6275* (2013.01); *H04W 72/1226* (2013.01)

(56) References Cited

U.S. PATENT DOCUMENTS

| | | | | |
|---|---|---|---|---|
| 2012/0057547 | A1* | 3/2012 | Lohr | H04L 5/0007 370/329 |
| 2013/0040683 | A1 | 2/2013 | Siomina | 455/517 |
| 2014/0153536 | A1* | 6/2014 | Ouchi | H04W 52/146 370/329 |
| 2015/0312922 | A1 | 10/2015 | Uchino | 370/329 |

\* cited by examiner

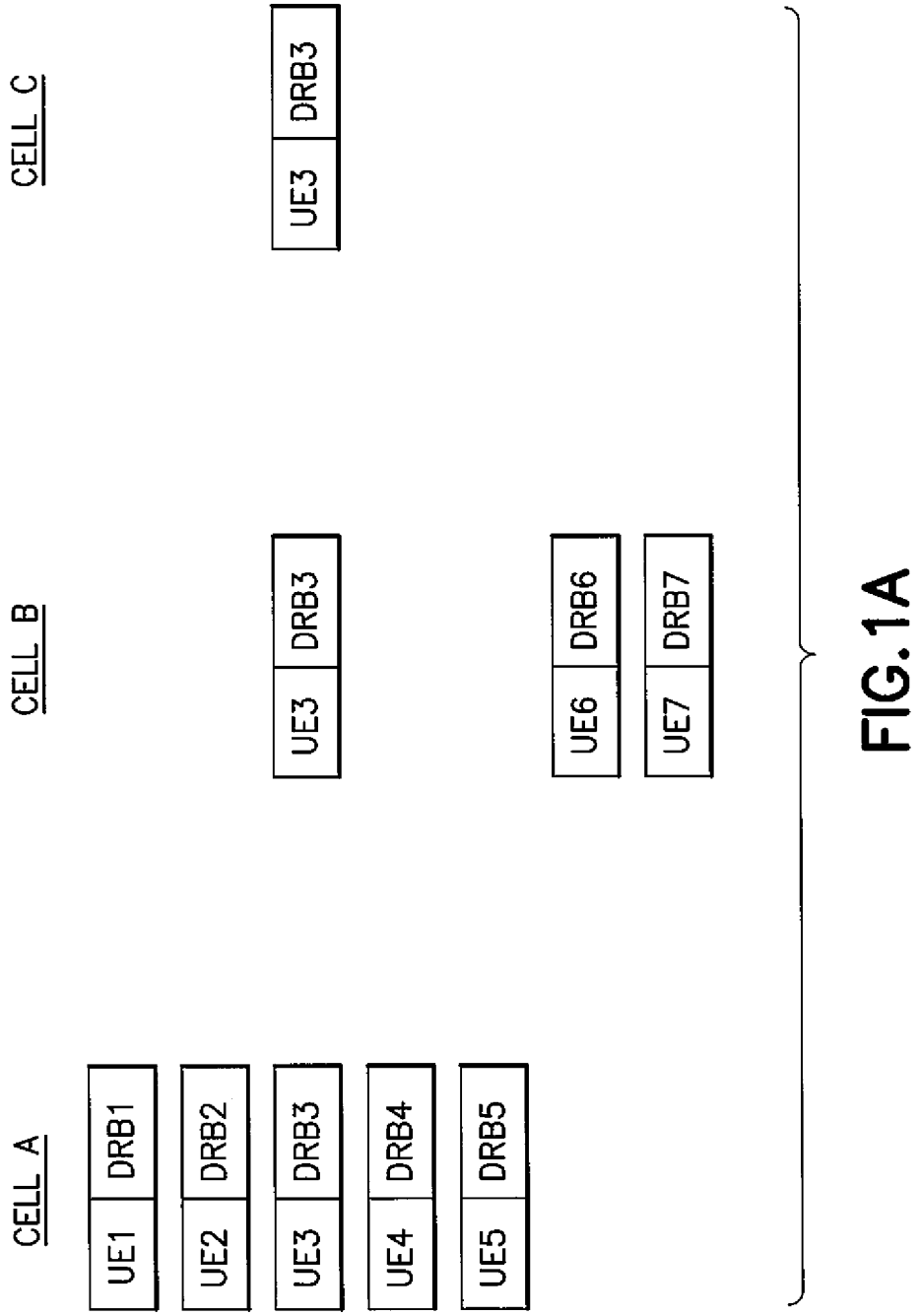

FAIR DISTRIBUTION OF RADIO RESOURCES BETWEEN GUARANTEED BIT RATE (GBR) AND NON-GBR DATA BEARERS

CROSS REFERENCE TO RELATED APPLICATION

This application is a continuation of U.S. patent application Ser. No. 14/541,585 filed on Nov. 14, 2014 and allowed on Jun. 7, 2017, the entire contents of which are herein incorporated as if appended hereto.

TECHNICAL FIELD

The invention relates generally to wireless communications, and more particularly concerns the scheduling of radio resources in cellular communications to accommodate both radio bearers with a guaranteed bit rate and those without. Specific examples are in the context of carrier aggregation in which some user equipments (UEs) are active on multiple LTE cells simultaneously.

BACKGROUND

A listing of acronyms used herein follows the detailed description section. In current cellular radio environments there may be various user equipments (UEs) that are operating/coexisting in a given cell that have different capabilities. For purposes of the examples herein these different capabilities may be concisely summarized as UEs operating under 3GPP Release 8/9 and those operating under 3GPP Release 10. Release 10 enables UEs to operate simultaneously on multiple cells in what is termed Carrier Aggregation (CA) mode. In carrier aggregation the bandwidth available for use by the wireless network consists of multiple component carriers; a given Release 10 UE may be operating on one component carrier designated as a primary cell (Pcell) and one or more further component carriers designated as secondary cells (Scells). Other Release 10 UEs may be operating in a non-CA mode and thus on only one carrier. For conciseness, herein these are referred to as non-CA UEs while those UEs for which there are two or more configured and activated component carriers are CA UEs. In this environment the Release 8/9 UEs operate on only one component carrier and are also referred to as non-CA UEs.

Data transmitted to any of these UEs is over one or multiple data radio bearer (DRBs). DRBs can have an associated guaranteed bit rate (GBR) but some DRBs may not; for conciseness the latter are referred to herein as non-GBR DRBs. DRBs assigned with a given CA UE may be served by any one or more of the CA UE's multiple active component carriers or cells. In this manner DRBs are associated with a given UE rather than with a given component carrier; a single DRB assigned to a given CA UE may carry data to or from that UE on all of that CA UE's active component carriers. In general a given UE can have more than one DRB active at a given time, for example one high priority DRB for voice communications and another low priority DRB for social networking data updates.

One cellular access technology by the 3GPP is E-UTRAN, also known as LTE. In LTE the radio access node (traditionally the base station) is known as an eNodeB or eNB, and handles scheduling of uplink and downlink (UL and DL) radio resources for the various active UEs under its control. Conventional practice in LTE for allocating available radio resources by the eNodeB scheduler can result in either starvation of non-CA UE data bearers or not being able to meet the high throughput bit rate guarantees for GBR data bearers of CA UEs.

For example, if a CA UE has a highest priority in one serving cell for its assigned GBR data bearer but not in the other serving cell, it could be allocated radio resources in all serving cells to meet the quality of service (QoS) demand of its high bit-rate GBR data bearer(s). This can lead to starvation for some of the GBR or non-GBR data bearers of other UEs even though the other UEs may have a higher priority in the other serving cell than the scheduled CA UE GBR data bearer.

One seeming solution would be to schedule and allocate radio resources for GBR/non-GBR data bearers of CA or non-CA UEs in these UEs' respective serving cells in strict order of their priorities. An eNodeB may have admitted a high bit-rate GBR data bearer of a CA UE with the expectation that it could use a 'fatter' bit-pipe by utilizing radio resources from multiple serving cells. But if the radio channel conditions are poorer than expected in one or more serving cells, such a high bit-rate CA UE GBR data bearer's bit-rate guarantees may not be met to such an extent that the user experience may be adversely impacted. Another consideration is that there may be multiple UEs in a given cell, some having a GBR data bearer and some having a non-GBR data bearer. A situation may arise in that the non-GBR data bearers are not allocated due to continual high data volume needs of the GBR data bearers. What is needed in the art is a mechanism to ensure the guaranteed bit rates and quality of service requirements are still met while dealing more fairly in allocating radio resources among GBR data bearers of CA UEs and the GBR and non-GBR data bearers of non-CA UEs.

SUMMARY

Certain embodiments of the present invention are directed to an apparatus such as a radio network access node which in the LTE system is known as an eNodeB and is where the scheduler of network resources resides. Other embodiments are directed to a method and a computer readable memory that implements such a network scheduler to schedule user equipments as detailed further below.

According to one aspect there is a method of scheduling user equipments (UEs), the method comprising: in a cell, determining relative priorities of a plurality of data radio bearers (DRBs), each DRB associated with a respective UE having buffered data; and establishing a limit which divides radio resources that are available for allocation in the cell during a scheduling period into at least a first limited portion of the radio resources and a second remaining portion of the radio resources. Then according to the determined relative priorities: a) allocating up to the first limited portion of the radio resources to only the DRBs that have a guaranteed bit rate (GBR), and thereafter b) allocating the second remaining portion of the radio resources to only the DRBs which have not been fully allocated from the first limited portion. Then the method concludes with transmitting one or more schedules indicating to the respective UEs the radio resources that are allocated in the cell during the scheduling period.

A computing device or other such apparatus embodying the teachings herein may comprise at least one digital processor and a computer readable memory storing a computer readable program/computer executable code which when executed by the at least one processor causes the apparatus to perform the method essentially as summarized above. Other embodiments implementing these teachings may comprise the computer readable memory on which is stored such a program or executable code, which may then be distributed to end users via physical storage media or download to the end user's own physical storage media.

BRIEF DESCRIPTION OF THE DRAWINGS

FIG. 1A is a block illustration showing three cells in which there are various data radio bearers associated with respective user equipments.

DETAILED DESCRIPTION

Figure 1B:
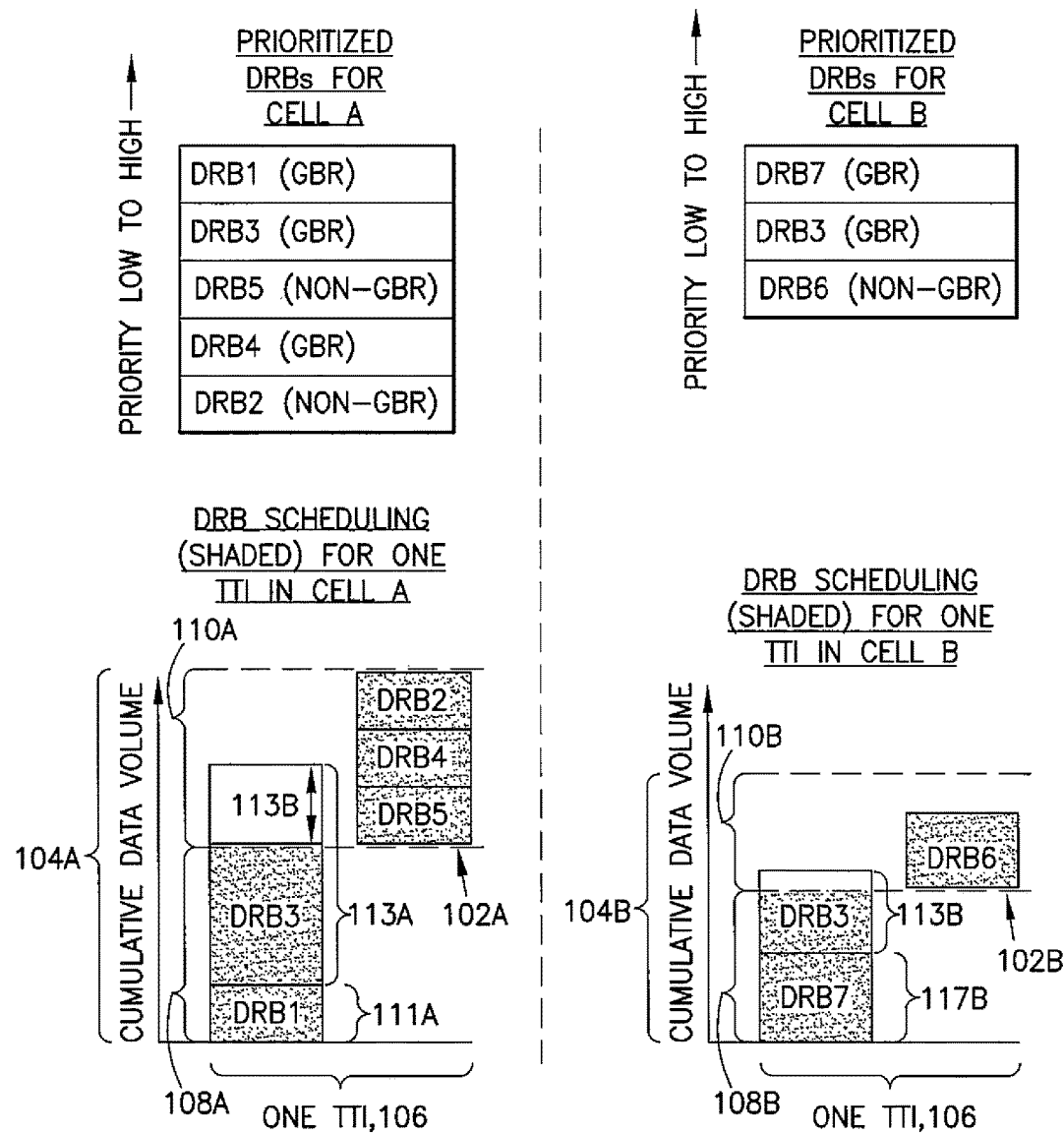
FIG. 1B shows block diagrams for Cell A and Cell B in which the DRBs from FIG. 1A for each of these cells are prioritized and allocated according to one example embodiment of the invention.

In the Summary above and in the Detailed Description and the claims below, and in the accompanying drawings, reference is made to particular features (including method steps) of the invention. It is to be understood that these various features may be combined regardless that the description herein does not explore explicitly every such possible combination. The specific embodiments that are detailed with particularity below are not a limit to the general teachings herein, and such exemplary embodiments by themselves are not a limit to the scope of the ensuing claims but rather teach the principles of the invention and illuminate the meaning of such ensuing claims.

In general terms the examples below illustrate a more equitable balance in the scheduler's allocation of radio resources among GBR data bearers of CA UEs and GBR and non-GBR data bearers of non-CA UEs, while also trying to ensure that CA UE GBR data bearer bit-rate guarantees and QoS is met. More specifically, certain implementations of these teachings provide for a limited portion of radio resources in a cell that are available for allocation within a given period (such as a transmission time interval TTI) to be allocated to GBR data bearers. For convenience this is referred to herein as the first phase of the resource allocation. The remaining portion of those available resources are then allocated to the remaining carriers that have not yet been allocated by the limited portion in what is referred to herein as the second phase.

The examples below assume scheduling of DL resources, where the eNodeB scheduler is directly aware of how much data is in queue for it to send to each of the UEs under its control, but the broader teachings herein apply also for scheduling of UL resources. Different cellular access technologies may use different techniques but in general the scheduler of radio resources in a given radio network will know, at least approximately, how much UL data is in queue to be sent from each UE under its control. As one non-limiting implementation of how the network can obtain this knowledge, the UTRAN and E-UTRAN technologies have the UEs provide the network with periodic UL buffer status reports indicating UL buffer occupancy for each of the UE's active data bearers.

The following definitions provide a clearer context for the more specific examples below of downlink scheduling. Active UEs refer to UEs having downlink data pending for transmission at the eNodeB. A UE may have an ongoing active connection to the network (e.g., it is in a connected mode or state) but if it has no data in its UL buffer and the network has no data in this UE's DL buffer then the UE is not 'active' in the manner this term is used herein for scheduling and resource allocation purposes. Serving cells of the UEs are the cell or cells which are activated, in that transmission of user data is possible in the cell with this UE. A CA UE can have more than one, and in current iterations of the LTE system up to five, serving cells. In the LTE system the cell through which the UE established its radio resource control (RRC) connection to the eNodeB is known as the Primary Cell (Pcell) while other serving cells are known as Secondary Cells (Scells). A non-CA UE can have only one serving cell. In the description below it is assumed for convenience that a single eNodeB controls all the serving cells of the described CA UEs.

Generally the eNodeB considers active UEs, both CA and non-CA UEs, independently for scheduling purposes in each of its serving cells based on a weighted priority which is calculated using scheduling parameters. For example, the eNodeB scheduler in one example implementation calculates, for each cell and for all data radio bearers of the active UEs (those DRBs that have non-zero pending data), the weighted priority by using multiple scheduling factors including data radio bearer priority, packet delay, channel quality and amount of pending data for the active UE's DRB. For carrier aggregated UEs this weighted priority is calculated in each of its corresponding serving cells. For a given UE having pending data for more than one DRB, the eNodeB scheduler computes a weighted priority for each of those DRBs, using the above parameters and using the amount of data pending for that DRB.

In the LTE system the normal scheduling period is one TTI which lasts 1 ms, though in other radio access technologies and/or in future developments of LTE the defined scheduling period may differ or may be known by another name. In the LTE system the UEs are scheduled by means of a Physical Downlink Control Channel (PDCCH), though of course the particular scheduling mechanism may differ in other and/or future radio access technologies.

Returning to an example specific to LTE, once the eNodeB scheduler has the DRBs of the active UEs in a given cell in order of the relative DRB priorities, UEs are selected for scheduling in the order of the weighted priority of their associated DRB regardless of whether the UE is a CA UE or a non-CA UE. While the priority does not change between the first and second phases of resource allocation according to embodiments of these teachings only the GBR data radio bearers are considered during the first phase. In one particular but non-limiting embodiment, the eNodeB scheduler assigns to each radio data bearer a set of tokens which the eNodeB calculates based on the bit rate associated with the data radio bearer. These tokens are refreshed periodically (such as once per 20 ms, more generally over a multiple of scheduling periods) or when the UE data bearer is scheduled.

For a GBR data bearer, these tokens correspond to the number of bytes that would accumulate at the guaranteed bit rate over the token refresh period. For a GBR data bearer, the accumulated tokens define the total number of bytes that can be scheduled by the eNodeB over a certain duration, such as over one scheduling period which in this LTE example is one TTI=1 ms. For a non-GBR data bearer, these tokens correspond to the number of bytes that would accumulate at the configured minimum bit rate over the token refresh period. For a non-GBR data bearer, the accumulated tokens define the minimum number of bytes that should be scheduled by the eNodeB over a certain duration such as one scheduling period to ensure fairness of the eNodeB's allocation of radio resources for the non-GBR data bearer.

To ensure GBR bearer bit-rate guarantees, only the GBR data bearers are considered during the first phase of resource allocations for a given scheduling period. Within the GBR data bearers, the highest weighted priority GBR data bearer in a serving cell is selected for scheduling in that scheduling period. To ensure fairness for non-GBR bearers, in a scheduling period the GBR data bearers are allocated radio resources only up to a dynamically derived percentage of the total radio resources that are available for the eNodeB to allocate in that scheduling period. In other embodiments some other threshold apart from a percentage may be used, so this dynamically derived percentage can be referred to more generally as a first limited portion of the radio resources that are available for allocation in the cell during a scheduling period. For systems which utilize semi-persistent scheduling, a semi-persistent allocation removes the semi-persistently allocated resources that were previously allocated from what is available for the eNodeB to allocate in a given TTI and so need no special treatment to be handled by the example embodiments of these teachings. Examples of this dynamically derived percentage is shown in FIG. 1B as the limits 102A and 102B as well as in FIG. 3 at block 304; and as the cell aggregate GBR tokens in FIG. 2 at block 202. This limit/percentage is derived by the eNodeB scheduler in each TTI based on the aggregate of GBR rates of all the admitted (non-zero pending data) DRBs in the system. For example, if there is a total of 20 Mbps (mega bits per second) of GBR DRBs that have been admitted then the eNodeB scheduler may set this limit at 20 K bits for the scheduling period (1 TTI=1 ms in LTE), meaning in the first phase of the resource allocations there are 10 Kbits reserved for the GBR DRBs. In other embodiments as is shown by example at FIG. 1B the eNodeB scheduler can set different such limits per cell for the same period being scheduled.

The remaining radio resources on each serving cell within that same scheduling period are allocated to other data bearers in order of their weighted priority, regardless of whether these other data bearers are GBR or non-GBR DRBs. These remaining resources are those above the configurable percentage/limit and further include any of the configurable percentage/limited first portion of resources which have not yet been allocated during the first phase. If we term these remaining radio resources as a second remaining portion of the total radio resources available for allocation in the cell and scheduling period, they are allocated to only those DRBs which have not been fully allocated from the first limited portion, and are allocated in order of the weighted relative priorities of these DRBs.

The above may be concisely summarized as follows for a given cell and a given scheduling period. In any serving cell, the GBR data bearers are selected for scheduling in order of their weighted priority as determined for that serving cell. After scheduling of GBR data bearers up to the derived limit in each cell independently, the non-GBR data bearers as well as any GBR data bearers that were not fully allocated are selected for scheduling on the remaining radio resources in order of their weighted priority. The end result of the limit for allocating to only the GBR DRBs is a fairer opportunity in a given cell for the non-GBR data bearers to get an allocation of radio resources.

To ensure that the bit-rate quality of service (QoS) guarantees are met for a high bit-rate GBR data bearer for a CA UE, additional radio resources from the remaining radio resources (after serving the highest priority GBR data bearers) can be assigned to this data bearer in its other serving cells, even ahead of a higher weighted priority non-GBR data bearer if the accumulated tokens for this GBR data bearer exceeds the derived limit and if the weighted priority of this GBR data bearer is less than the weighted priority of other data bearers in the other serving cells by a configurable balance-factor. That is to say, the eNodeB scheduler will schedule a lower priority GBR data bearer of a CA UE in a serving cell only if the following two conditions are met:
  a) GBR-bearer-accumulated-tokens (serving-cell-i) >threshold; and
  b) Priority-GBR-bearer(serving-cell-i)>Priority Other-bearer(serving-cell-i)−Balance-Factor The above 'Balance Factor' operates to reduce the priority of the 'Priority Other-bearer' so as to bias higher the priority of the 'priority-GBR-bearer'. It is only a bias factor and not absolute, so there may still be instances in which the priority of the 'Priority Other-bearer' is so far above that of the "Priority-GBR-bearer" that the condition b) above is not met.

After the GBR is met for a given data bearer/UE, radio resources are allocated for non-GBR data bearers based on their weighted priority. But note that this does not guarantee any non-GBR will actually get an allocation in that TTI in a given cell; the remaining radio resources are still allocated according to the relative weighted DRB priorities and so if there are other higher-priority data bearers not allocated within the derived limit it may be that one or more low-priority non-GBR data bearers get no resources allocated at all in this TTI. This circumstance is detailed in the non-limiting example below.

FIGS. 1A-B illustrate scheduling of radio resources in one TTI according to an example implementation of these teachings. The scheduling is initially described for Cell A but DRB3 which is assigned to active CA UE3 is active also in Cells B and C so there is also described some scheduling in those Scells Cells B and C. Cells A, B and C represent three component carriers of a carrier aggregation system. FIG. 1A shows those three cells and the DRBs (and associated active UEs) for each cell, though the order in which the DRBs are listed in FIG. 1A does not imply relative priority. In Cell A for this TTI the active UEs are UE1 associated with data radio bearer DRB1, UE2 associated with data radio bearer DRB2, UE3 associated with data radio bearer DRB3, UE4 associated with data radio bearer DRB4 and UE5 associated with data radio bearer DRB5. In Cell B for this same TTI the active UEs are UE3 associated with the same data radio bearer DRB3, UE6 associated with data radio bearer DRB6 and UE7 associated with data radio bearer DRB7. In Cell C for this same TTI the active UEs are only UE3 associated with the same data radio bearer DRB3. UE3 is of course a CA UE, and assume for this example that Cells B and C are configured and assigned to UE3. Assume further that the amount of data for UE3 on DRB3 is voluminous enough that the eNodeB scheduler splits it among Cells A, B and C according to these teachings so as to meet the GBR promised for DRB3.

Firstly, the relative priorities of the data radio bearers (DRBs) of Cell A are determined, each DRB being associated with a respective UE having buffered data as noted above for FIG. 1A. These determined priorities are shown at the upper portion of FIG. 1B, where the higher relative priorities run top to bottom as illustrated and the resources at the bottom of FIG. 1B are flipped in order because the resources are filled bottom to top (zero to 100%) in order of priority. From FIG. 1B we see that DRB1, DRB3 and DRB4 are GBR data bearers while DRB2 and DRB5 are not. For purposes of this example assume non-GBR DRB5 has a higher weighted priority than GBR DRB4.

Next and as shown at the lower portion of FIG. 1B, the eNodeB scheduler establishes a limit 102A which divides total radio resources 104A that are available for allocation in Cell A during a scheduling period 106 into at least a first limited portion 108A of the total radio resources and a second remaining portion 110A of the total radio resources. This limit 102A is the dynamically derived percentage/limit mentioned above, which the eNodeB scheduler can set per cell based on multiple factors to ensure fairness of the non-GBR data bearer's opportunity to get an allocation.

The eNodeB scheduler in Cell A then allocates those resources 104A in two phases, each phase according to the determined relative priorities shown for Cell A at the upper portion of FIG. 1B. In the first phase no more than the first limited portion 108A of the radio resources 104A are allocated to only the DRBs that have a guaranteed bit rate (GBR). For this specific example that means DRB1, DRB3 and DRB4 are the only DRBs eligible to be allocated in this first phase, and they will be considered in that order of priority according to the weighted priorities shown at the upper portion of FIG. 1B.

FIG. 1B illustrates by shading at the lower left portion those data bearers which are allocated resources in Cell A for this TTI 106; the relative volume of resources being allocated is roughly reflected by the vertical extent of the illustrated DRB and shading. So in this first phase for Cell A, DRB1 is allocated first since it is highest priority. Because the allocation to DRB1 is for a data volume 111A (corresponding to tokens) that is accommodated by resources in Cell A less than the limit 102A, then DRB3 is next allocated in Cell A during the first phase. In this example the total bytes (data volume corresponding to tokens) 113A that needs to be allocated to DRB3 in order to meet the GBR would exceed the limit 102A when added on top of the allocation already set aside for the higher priority DRB1, then DRB3 will be allocated during the first phase in Cell A an amount of resources only up to the limit 102A as shown by shading. The excess amount 113B of the data volume 113A in tokens that is not accounted for by shading is the amount of resources to be allocated to UE3 in one or more other cells in this TTI so as to satisfy the GBR of DRB3 for UE3. Those other-cell allocations are detailed below. The eNodeB scheduler determines all of the phase 1 allocations for all of its cells before beginning its phase 2 determination for any cell. This enables it to know at the start of its phase 2 allocations whether the GBR for the CA UE DRBs are fully satisfied from the phase 1 allocations or if any of those DRBs need to be considered again in the scheduler's phase 2 resource allocations.

While the derived limit 102A may be expressed as a percentage or a number of bytes or tokens or by some other relative or absolute unit of measure, in fact most radio systems allocate in discrete quantums of radio resources, whether the smallest quantum is a resource element, an OFDM symbol, or the like. So it may be that in practice the limit 102A is set for example at 60% of the total resources 104A but due to the fact that resources in the subject radio system are actually allocated in increments of resource elements, the nearest the eNodeB scheduler can get to the limit 104A without exceeding it may for example be 58.8%. This apparent disparity is a mere formality due to different granularities in how the limit 104A is expressed versus the smallest quantum in which resources are allocated, and does not impact the general scope of these teachings. In one implementation the limit 102A is observed if the eNodeB scheduler does not exceed it, or in another implementation exceeds the limit 102A by less than the minimum quantum or resource allocation that is allowed in the operative radio access technology. The eNodeB scheduler can allocate up to the first limited portion of the radio resources by using either implementation.

With the first phase allocations complete for Cell A, the eNodeB scheduler will then perform the first phase allocations in the other cells. The allocations in Cell B follow the same principles as described above for Cell A, but in this case there is a residual amount of data 113B (same as the excess amount 113B from Cell A) for UE3 that was not able to be allocated during the first phase in Cell A to DRB3. This residual amount of data/tokens 113B is considered for allocation to DRB3 in Cell B for the same TTI, since DRB3 is associated with UE3 in all of its assigned serving cells which in this example is Cells A, B and C. DRB3 is therefore active in each of these three cells. Due to this residual amount of data/tokens 113B for which resources were not allocated in Cell A during the first phase, DRB3 is next considered during the first phase for resource allocation in Cell B. There is buffered data in Cell B for both DRB6 and DRB7, and the relative weighted priorities shown at the upper right of FIG. 1B are DRB7 having the highest relative priority, DRB3 and DRB6 having the lowest relative priority, where DRB7 and DRB3 are the GBR data bearers. As mentioned above, a biasing or balancing factor may be included to bias higher the weighted priority of a DRB associated with a CA UE to better ensure it gets a resource allocation in other cells, but for this example assume the balancing factor does not put the weighted priority of DRB3 above that of DRB7 in Cell B.

The limit 102B that is derived by the scheduler for Cell B may be different from that of Cell A, as may be the total amount of radio resources 104B that are available to be allocated in the TTI 106. DRB7 and DRB3 are GBR data bearers and thus eligible for allocation in the first phase, so Cell B allocates to the highest priority GBR data bearer DRB7 an amount of resources to fully accommodate its volume of data/tokens 117B, and the eNodeB scheduler also allocates to GBR data bearer DRB3 an amount of resources (shaded portion of 113B) that, due to the limit 102B which sets the first limited portion 108B of resources in Cell B for the first phase allocations, does not fully accommodate the residual volume of data/tokens 113B left over from Cell A. The unshaded portion of the volume 113B (leftover tokens not allocated in Cell B) is allocated during the first phase in Cell C, which is also assigned to UE3 in this example. This allocation in Cell C would be similar in principle to that described for the first phase of Cell B, and so Cell C allocations are not detailed further except to note that the combined allocations to DRB3 in Cells A, B and C fully accommodate the data in queue (shown as 113A) for UE3 and so DRB3 need not be considered for the second phase allocations.

DRB3 is associated with CA UE3 was not fully allocated in the above example during the first phase in Cell A, and because DRB3 was a GBR data bearer it was considered again for allocation during the first phase in one or more other cells (Cells B and C) assigned to UE3 until the GBR for DRB3 is satisfied. So long as that GBR data bearer is satisfied during the first phase across the CA UE's multiple cells, such a GBR DRB is not eligible for allocation in the second phase of the original or any other cell since it will have been fully allocated by the start of the scheduler's second phase allocation decisions. The term 'the DRBs which have not been fully allocated from the first limited portion' includes this implementation where a DRB for a CA UE gets a further allocation during the first phase in one or more other cells to meet that DRB's GBR.

In this example DRB3 is the only GBR DRB for an active CA UE, and for this example its GBR is met from the scheduler's first phase allocations in Cells A, B and C. With all the first phase allocations complete now the eNodeB scheduler proceeds to the second phase for Cell A in TTI 106 which is shown in the lower left portion of FIG. 1B above the limit 102A. Having been fully allocated during the first phase, both DRB1 and DRB3 are no longer eligible for allocation during the second phase in any cell and so the second phase priorities for allocating in Cell A are DRB5, DRB4 and DRB2 in that priority order.

The eNodeB scheduler allocates in Cell A during the second phase, according to the determined relative priorities, the second remaining portion 110A of the radio resources to only the DRBs which have not been fully allocated from the first limited portion. Note that in this second phase it matters not whether a DRB being considered for resource allocation is GBR or not; for this second phase the relevance of GBR versus non-GBR is accounted for only in the determined relative priorities and this GBR/non-GBR accounting may be direct or indirect depending on specifics of how the relative weighted priorities are calculated. In this example it is assumed these three DRBs are fully allocated in the second phase of Cell A for this TTI 106.

In Cell B DRB7 and DRB3 were fully allocated in the first phase, leaving only DRB6 which is fully allocated during the second phase using the second remaining portion 110B as shown at the lower right portion of FIG. 1B. As shown at FIG. 1A the only active UE in Cell C is UE3, and its associated DRB3 has been fully allocated during the first phase so there are no further data bearers to consider for Cell C and no second phase allocations.

In the above example, due to high volume GBR DRBs the first limited portion 108A/108B of the total radio resources 104A/104B was sufficient to allocate resources in the first phase to only two DRBs. But in other instances there may be much lower volumes of data to send on the highest priority GBR DRBs that are eligible for being allocated in the first phase. Both instances are addressed by deriving the limit 102A/102B of FIG. 1B based on the GBR demand from the system as detailed above. In this case it matters not whether the GBR DRBs allocated in the first phase are high volume or low volume or a mixture of both—deriving the limit based on GBR demand of the admitted DBRs will in all cases reserve the appropriate amount of available resources for the GBR allocations during the first phase. This holds true even if, as with the example above, not all GBR DRBs are fully allocated during only the first phase since they are still subject to further resource allocations during the second phase.

Certain embodiments and implementations of these teachings provide advantages in that non-GBR data bearers in a serving cell are fairly allocated radio resources as compared to a GBR data bearer in each serving cell. Alongside that fairness advantage, to ensure that high bit-rate QoS guarantees of GBR data bearers of a CA UE are met, additional radio resources are allocated to the GBR data bearer in non-favorable conditions in its serving cells while ensuring fairness to other data bearers in that serving cell.

Figure 2A:
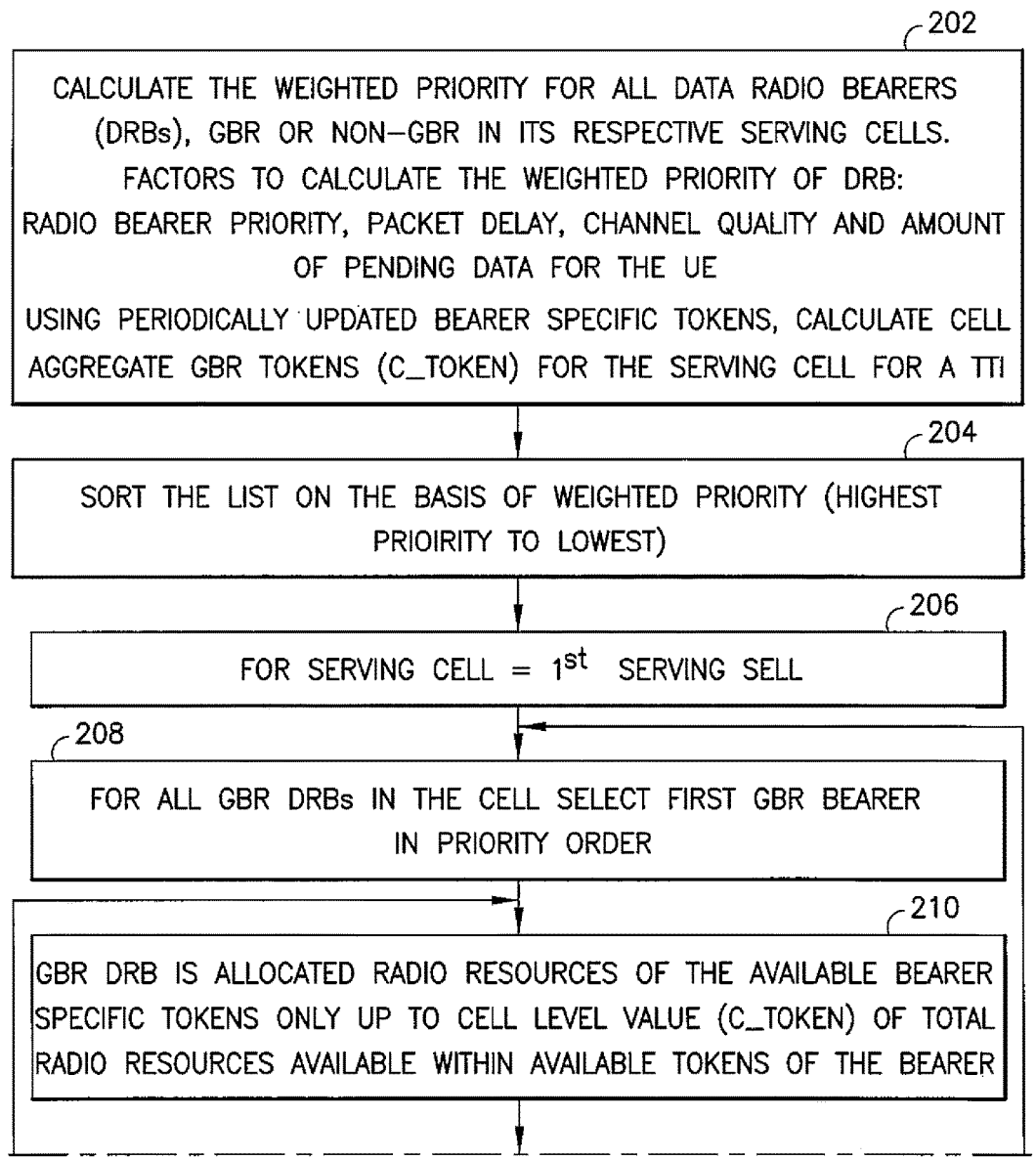
FIG. 2 (divided among two drawing sheets as 2A and 2B) and FIG. 3 are different process flow diagrams each showing a method and operation of a computing device according to certain exemplary embodiments of these teachings.
Figure 2B:
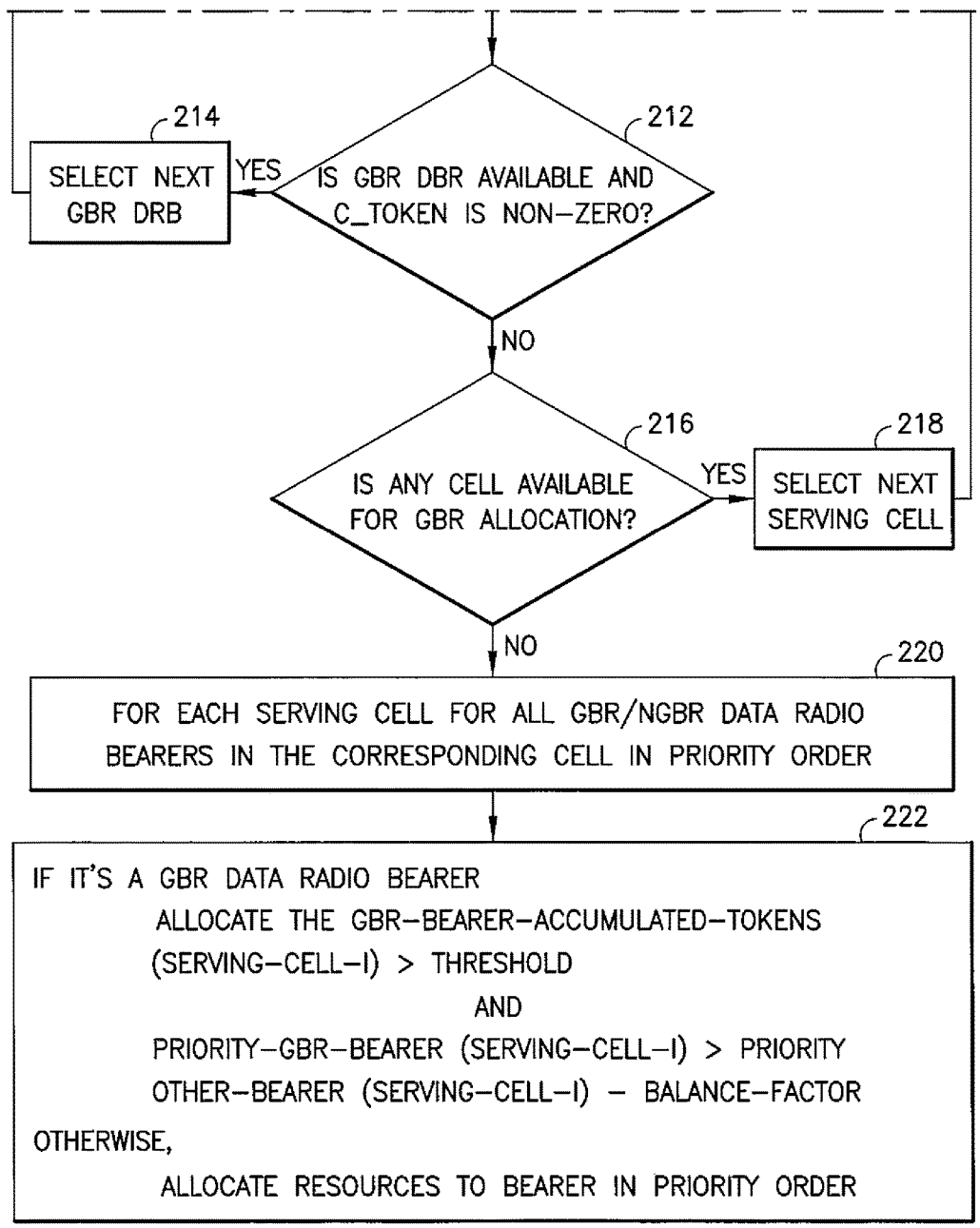

FIG. 2 is a single flow diagram, divided among two drawing sheets as FIGS. 2A and 2B, illustrating key steps in the process described by example above for allocating radio resources according to an embodiment of these teachings. At block 202 the network resource scheduler calculates the weighted priority for all data radio bearers (GBR and non-GBR) in its respective serving cells. In one specific implementation the factors used to calculate the weighted priority of the data radio bearers include the Radio Bearer priority, Packet Delay, Channel Quality and amount of pending data for the UE. The scheduler also calculates for each cell an aggregate number of GBR tokens (C_token) for a given TTI. This aggregate number of GBR tokens gives the limit 102A for how much of the available radio resources in that TTI may be allocated in the first phase to only GBR DRBs, and is one implementation of the dynamically derived percentage of the total radio resources available for allocation in the scheduling period that was described above. Then for each cell the weighted DRBs are sorted in order of priority at block 204.

For the first serving cell at block 206 the first GBR of the ordered priority is selected at block 208 and allocated at block 210 the available bearer specific tokens only up to the limit, which in this implementation is expressed as the cell level value (C_token) of total radio resources that are available within the total available tokens of the data bearer. Block 212 tests if there are other GBR data bearers in the prioritized list and whether there are still tokens available (C_token>0) for the first phase of resource allocations. If both conditions are true then block 214 returns the process to block 210 where the next highest priority GBR data bearer is allocated in the same manner.

From the above description there are three distinct limits to the total allocations that the eNodeB scheduler can allocate during the first phase to any given GBR DRB. The pending Q load or Q length of the bearer which is the size of the buffer waiting to be served for that bearer, the bearer specific tokens which the eNodeB scheduler assigns to each DRB (calculated based on that DRB's bit rate and periodically refreshed), and the cell level value C_token. In one particular implementation whichever is the smaller number is allocated in the first phase, and in the second phase allocations the eNodeB scheduler only observes the first two of these limits. Block 210 of FIG. 2 illustrates allocations of the available bearer specific tokens up to the dynamically determined cell specific limit (C-token), and so for this implementation the maximum resource allocation that can occur at block 210 of FIG. 2 is the lesser of the bearer specific tokens and C-token.

Once all the GBR data bearers in the first serving cell are allocated up to the limit C_token, the process continues at bock 216 in the next cell, which in the example above was Cell B. If there is another cell available for GBR allocation then block 218 returns the process to block 208 where the first phase allocations are done for that next cell. This repeats until there are no further cells available for GBR allocation, at which block 220 of the process moves to the second phase resource allocations and looks to the per-cell lists of all the GBR and non-GBR data bearers in the priority list (those which have not yet been fully allocated in the first phase).

Block 222 tells specifically how the remaining resources are allocated. If the next data bearer in the priority list is a GBR data bearer, the network scheduler allocates the GBR-bearer-accumulated-tokens (serving-cell-i) which are above the threshold C_token, since those tokens below the threshold are assumed to have been allocated already at block 210 in the first phase. As mentioned above, a 'balance-factor' may be imposed when setting the weighted priorities so as to bias higher the weighted priority of the GBR data bearers for the CA UEs if the buffered GBR data exceeds a threshold indicating non-fulfillment of bit rate guarantees, and one algorithm for doing this is shown at block 222. If the next data bearer in the priority list is a non-GBR data bearer, then the scheduler simply allocates resources to that data bearer in the weighted priority order. The scheduler follows block 222 for each data bearer in each cell until all of the cell's resources are allocated.

Figure 3:
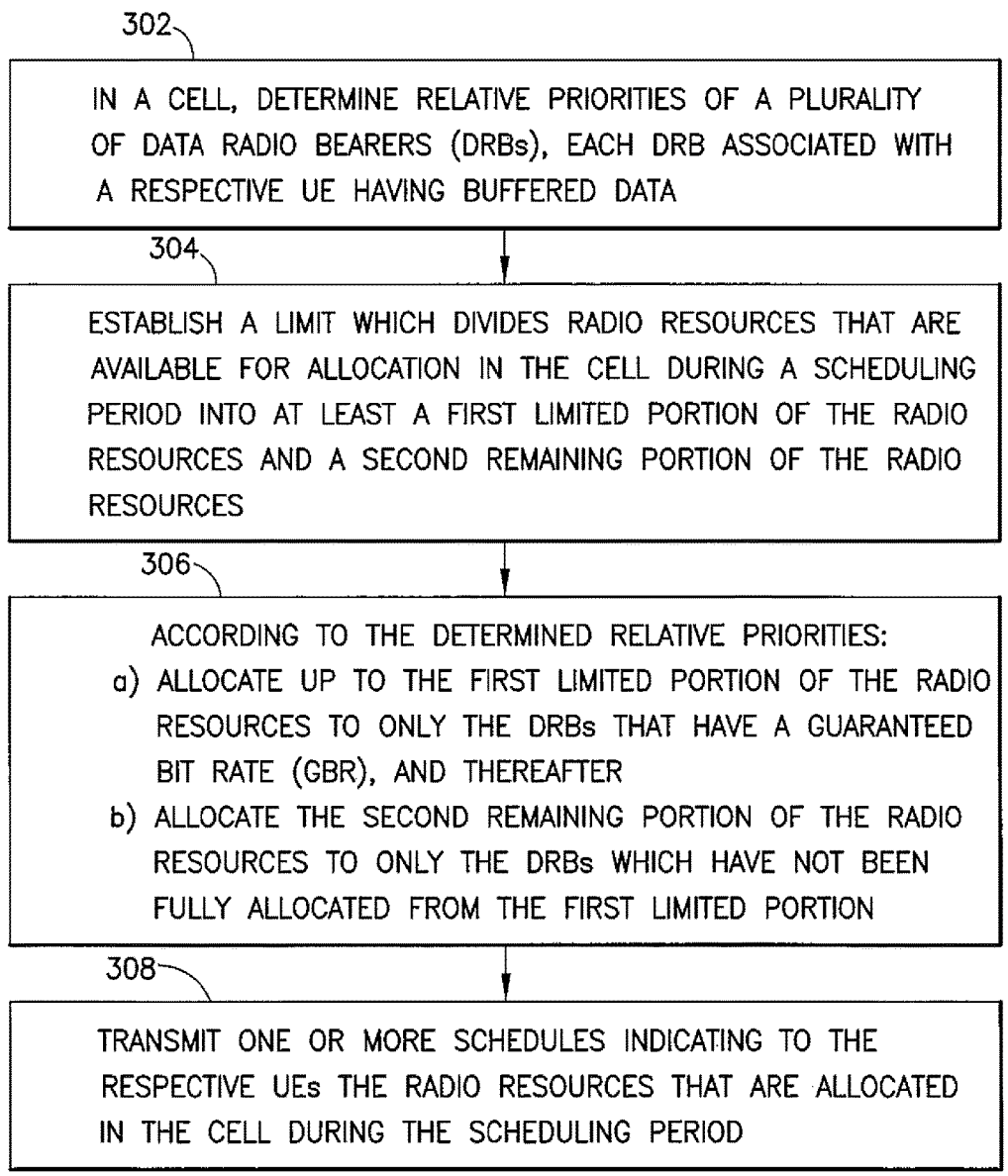

FIG. 3 is a logic flow diagram that summarizes other aspects of the above embodiments for scheduling user equipments (UEs). FIG. 3 describes explicitly for scheduling in a (single) cell, but as will be detailed below is readily expandable to cover the carrier aggregation—multiple cell scheduling of the above examples. Referring to FIG. 3, at block 302 in a cell, relative priorities are determined of a plurality of data radio bearers (DRBs), each DRB associated with a respective UE having buffered data. With these priorities of DRBs in the cell established, then at block 304 there is established a limit which divides radio resources that are available for allocation in the cell during a scheduling period into at least a first limited portion of the radio resources and a second remaining portion of the radio resources. The network may recalculate this limit for different TTIs and even for different cells in the same TTI based on a number of factors, dynamically or semi-statically. In the above non-limiting example this limit was calculated per TTI using the aggregate GBRs of all the DRBs being scheduled.

Block 306 is where the actual resource allocations take place, all according to the determined relative priorities. In step a) resources are allocated, up to the first limited portion of the radio resources, to only the DRBs that have a guaranteed bit rate (GBR). Thereafter at step b) there is allocated the second remaining portion of the radio resources, and these are allocated to only the DRBs which have not been fully allocated from the first limited portion. Finally at block 308 one or more schedules are transmitted to the respective UEs associated with DRBs which got a resource allocation, and this schedule(s) indicates the radio resources that are allocated according to block 306 in the cell to these respective UEs during the scheduling period. In the LTE system this schedule is transmitted in a physical downlink control channel (PDCCH), though a schedule according to block 308 may take different forms or be known by different names in other cellular wireless systems. The allocations may be transmitted in multiple different schedules sent in different subframes of the PDCCH where currently in LTE each subframe can have a maximum of one allocation for a UE and allocations for multiple UEs are limited by the PDCCH capacity.

FIG. 3 is readily extended to the carrier aggregation model in that the explicit functions shown at FIG. 3 are executed across a plurality of carrier aggregated cells, each of those cells having a respective plurality of DRBs such that each considered DRB is associated with a respective UE having buffered data in that cell. In this CA case the relative priorities mentioned at block 302 for each respective plurality of DRBs are determined for each of the respective carrier aggregated cells; a predetermined limit is established for radio resources that are available for allocation in each of the respective carrier aggregated cells; and the radio resources are allocated in turn in each of the respective carrier aggregated cells according to step a) of block 306, and thereafter in turn in each of the respective carrier aggregated cells according to step b) of block 306.

This CA extension can be further characterized for some embodiments in that the relative priorities for DRBs in different ones of the plurality of cells which are associated with a given carrier-aggregated UE are determined separately for each of the plurality of cells.

Recall the example above in which UE3 was allocated in Cell B for excess capacity it needed but for which it was not allocated in Cell A. FIG. 3 can be readily adapted to encompass this scenario in that the radio resources allocated according to step a) of block 306 in a first one of the cells (e.g., Cell A in the example above) during the scheduling period to one of the DRBs having a GBR handles less than a total amount of the buffered data for the UE associated with the respective DRB, in which the given UE associated with the respective DRB is configured for carrier aggregation in the scheduling period across at least a second one of the cells (e.g., this is a CA UE). And further the radio resources allocated according to step a) of block 306 in at least the second one of the cells (e.g., Cell B in the example above) during the scheduling period to at least one further DRB associated with the given UE are sufficient to meet the GBR for a total amount of the buffered data for the given UE.

The specific byte calculations in the example above may be generalized as the data volume for each of the DRBs having a GBR is determined using the GBR; and the data volume for each of the DRBs not having a GBR is determined using a minimum bit rate associated the respective DRB. More specifically, in one implementation of these teachings the data volume for each of the DRBs having a GBR indicates a total number of bytes, at the GBR of the respective DRB, that may be scheduled on the respective DRB over the scheduling period; and the data volume for each of the DRBs not having a GBR indicates a minimum number of bytes, at the minimum bit rate for the respective DRB, that must be scheduled on the respective DRB over the scheduling period.

One non-limiting example of how the relative priorities may be determined at block 302 is to do so in a weighted fashion using at least the parameters: priority of the DRBs as configured by a network control plane; packet delay requirements; channel quality; and buffer occupancy of the respective UE associated with the respective DRB.

The logic diagram of FIGS. 2 and 3 may each be considered to illustrate the operation of a method, and a result of execution of a computer program stored in a computer readable memory, and a specific manner in which components of an electronic device are configured to cause that electronic device to operate. The various blocks shown in each of FIGS. 2 and 3 may also be considered as a plurality of coupled logic circuit elements constructed to carry out the associated function(s), or specific result of strings of computer program code or instructions stored in a memory.

Figure 4:
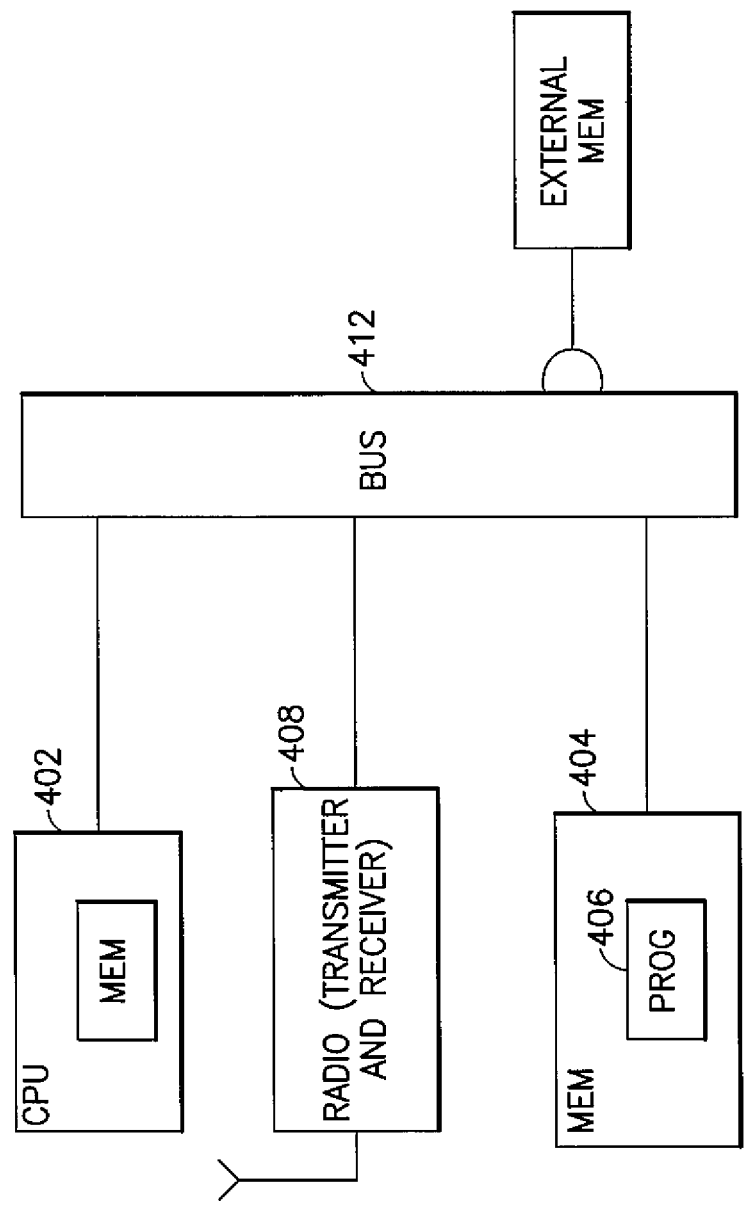
FIG. 4 is a high level schematic block diagram illustrating relevant portions of a computing device such as a radio network access node with a radio resource scheduler that is suitable for practicing the described and exemplary embodiments of these teachings.

As shown in the high level block diagram of FIG. 4 a computing system or device is shown, which includes processing means such as a central processing unit (CPU) 402 (more generally at least one processor) that may be implemented as a general processor, an application specific integrated circuit (ASIC), a digital processor and the like; storing means such as at least one computer-readable memory (MEM) 404 storing at least one computer program (PROG) 406 having computer executable code, and communication means 408 such as a radio having a wireless transmitter, receiver, antenna, and associated circuitry for implementing radio functionality such as baseband processor, amplifiers, filters, digital to analog and analog to digital converters, and the like. All these components are connected to communicate with one another through a bus 612. The network scheduler in the network eNodeB mentioned above may be implemented by the CPU 402 and the memory 404 with the stored program 406. Also stored in the MEM 404 at reference number 406 are the computer code or computer implementable algorithm(s) for the computer system/device to operate according to these teachings as detailed by the exemplary embodiments described above. Such a computer system/device may be implemented as an eNodeB, a base station, a remote radio head, a central network entity controlling multiple eNodeBs and/or radio heads, and the like.

The computer readable memory 404 may comprise a random access memory (RAM) and a mass storage, and may be embodied as memory resident in the device or as an external memory as shown that is removable from the device. Various embodiments of the computer readable MEMs 404 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like.

The CPU 402 and the memory 404 are shown as separate components, however in some embodiments, the memory 404 may be integrated with the at least one CPU 402 on a single chip, as shown in FIG. 4 as a non-limiting example. In some embodiments, the memory 404 may be shared dynamically by the CPU 402 and by other processors not implementing these teachings. In some embodiments, the CPU 402 may be operating in either single precision floating point (32-bit) or double precision floating point (64-bit) format.

The following acronyms are used herein:
carrier aggregation CA
data radio bearer DRB
downlink DL
dynamic random access memory DRAM
electrically erasable programmable ROM EEPROM
Evolved UMTS Terrestrial Radio Access Network E-UTRAN
guaranteed bit rate GBR
Long Term Evolution LTE
millisecond ms
physical downlink control channel PDCCH
orthogonal frequency division multiplex OFDM
quality of service QoS
random access memory RAM
static random access memory SRAM
Third Generation Partnership Project 3GPP
Transmission time interval TTI
Universal Mobile Telecommunication System UMTS
uplink UL
user equipment UE

What is claimed is:

1. A method of scheduling user equipments, the method comprising:
   in a cell, wherein the cell is one of a plurality of carrier aggregated cells each having a respective plurality of data radio bearers, determining relative priorities for each respective plurality of data radio bearers of the respective carrier aggregated cells, each data radio bearer associated with a respective user equipment having buffered data;
   establishing a limit which divides radio resources that are available for allocation in the plurality of the aggregated cells during a scheduling period into at least a first limited portion of the radio resources and a second remaining portion of the radio resources;
   according to the determined relative priorities:
   a) allocating the first limited portion of the radio resources from the first cell to only the data radio bearers that have a guaranteed bit rate, and thereafter
   b) allocating from the other aggregated cells, the remaining portion of the radio resources to only the data radio bearers that have a guaranteed bit rate and which have not been fully allocated from the first limited portion of the previous aggregated cells;
   c) allocating the second remaining portion of the radio resources from each of the plurality of the cells to only the data radio bearers which have not been fully allocated from the first limited portion,
   and transmitting one or more schedules indicating to the respective user equipments the radio resources that are allocated in the cell during the scheduling period.

2. The method according to claim 1, wherein
the relative priorities for data radio bearers in different ones of the plurality of carrier aggregated cells which are associated with a given carrier-aggregated user equipment are determined separately for each of the plurality of cells.

3. The method according to claim 1, wherein:
the radio resources allocated in a first one of the carrier aggregated cells during the scheduling period to one of the data radio bearers having a guaranteed bit rate handles less than a total amount of the buffered data for the user equipment associated with the respective data radio bearer, in which the given user equipment associated with the respective data radio bearer is configured for carrier aggregation in the scheduling period across at least a second one of the carrier aggregated cells; and
the radio resources allocated in at least the second one of the carrier aggregated cells during the scheduling period to at least one further data radio bearer associated with the given user equipment are sufficient to meet the guaranteed bit rate for a total amount of the buffered data for the given user equipment.

4. The method according to claim 1, wherein:
the data volume for each of the data radio bearers having a guaranteed bit rate is determined using the guaranteed bit rate; and
the data volume for each of the data radio bearers not having a guaranteed bit rate is determined using a minimum bit rate associated the respective data radio bearer.

5. The method according to claim 4, wherein
the data volume for each of the data radio bearers having a guaranteed bit rate indicates a total number of bytes, at the guaranteed bit rate of the respective data radio bearer, that may be scheduled on the respective data radio bearer over the scheduling period; and
the data volume for each of the data radio bearers not having a guaranteed bit rate indicates a minimum number of bytes, at the minimum bit rate for the respective data radio bearer, that must be scheduled on the respective data radio bearer over the scheduling period.

6. The method according to claim 1, wherein the relative priorities of the plurality of data radio bearers are determined separately for each of the plurality of cells in a weighted fashion using at least:
   priority of the data radio bearers as configured by a network control plane;
   packet delay requirements;
   channel quality; and
   buffer occupancy of the respective user equipment associated with the respective data radio bearer.

7. The method according to claim 1, wherein the second remaining portion of the radio resources are allocated separately in each of the plurality of the cells according to the determined relative priorities to only the data radio bearers which have not been fully allocated from the first limited portion, regardless of whether said data radio bearers have a guaranteed bit rate or do not have a guaranteed bit rate.

8. A computing device comprising at least one digital processor and a computer readable memory storing a program of computer executable code which, when executed by the at least one processor, causes the computing device to at least:
   in a cell, wherein the cell is one of a plurality of carrier aggregated cells each having a respective plurality of data radio bearers, determine relative priorities for each respective plurality of data radio bearers of the respective carrier aggregated cells, each data radio bearer associated with a respective user equipment having buffered data;
   establish a limit which divides radio resources that are available for allocation in the plurality of the aggregated cells during a scheduling period into at least a first limited portion of the radio resources and a second remaining portion of the radio resources;
   according to the determined relative priorities:
   a) allocate the first limited portion of the radio resources from the first cell to only the data radio bearers that have a guaranteed bit rate, and thereafter
   b) allocate from the other aggregated cells, the remaining portion of the radio resources to only the data radio bearers that have a guaranteed bit rate and which have not been fully allocated from the first limited portion of the previous aggregated cells;
   c) allocate the second remaining portion of the radio resources to only the data radio bearers which have not been fully allocated from the first limited portion;
   and transmit one or more schedules to the respective user equipments indicating the radio resources that are allocated in the cell during the scheduling period.

9. The computing device according to claim 8, wherein the relative priorities for data radio bearers in different ones of the plurality of carrier aggregated cells which are associated with a given carrier-aggregated user equipment are determined separately for each of the plurality of cells.

10. The computing device according to claim 8, wherein:
   the radio resources allocated in a first one of the carrier aggregated cells during the scheduling period to one of the data radio bearers having a guaranteed bit rate handles less than a total amount of the buffered data for the user equipment associated with the respective data radio bearer, in which the given user equipment associated with the respective data radio bearer is configured for carrier aggregation in the scheduling period across at least a second one of the carrier aggregated cells; and
   the radio resources allocated in at least the second one of the carrier aggregated cells during the scheduling period to at least one further data radio bearer associated with the given user equipment are sufficient to meet the guaranteed bit rate for a total amount of the buffered data for the given user equipment.

11. The computing device according to claim 8, wherein:
   the data volume for each of the data radio bearers having a guaranteed bit rate is determined using the guaranteed bit rate; and
   the data volume for each of the data radio bearers not having a guaranteed bit rate is determined using a minimum bit rate associated the respective data radio bearer.

12. The computing device according to claim 11, wherein the data volume for each of the data radio bearers having a guaranteed bit rate indicates a total number of bytes, at the guaranteed bit rate of the respective data radio bearer, that may be scheduled on the respective data radio bearer over the scheduling period; and the data volume for each of the data radio bearers not having a guaranteed bit rate indicates a minimum number of bytes, at the minimum bit rate for the respective data radio bearer, that must be scheduled on the respective data radio bearer over the scheduling period.

13. The computing device according to claim 8, wherein the computing device comprises an eNodeB scheduler and the relative priorities of the plurality of data radio bearers are determined in a weighted fashion using a balance factor that biases upward the weighted priority of each data radio bearer having a guaranteed bit rate and associated with a carrier aggregated user equipment if the buffered guaranteed bit rate data exceeds a threshold indicating non-fulfillment of bit rate guarantees.

14. The computing device according to claim 8, wherein the second remaining portion of the radio resources are allocated separately in each of the plurality of the cells according to the determined relative priorities to only the data radio bearers which have not been fully allocated from the first limited portion, regardless of whether said data radio bearers have a guaranteed bit rate or do not have a guaranteed bit rate.

15. A computer readable memory on which is stored a computer program comprising executable code, the computer program comprising:
   code for determining, in a cell, wherein the cell is one of a plurality of carrier aggregated cells each having a respective plurality of data radio bearers, relative priorities of a plurality of data radio bearers, each data radio bearer associated with a respective user equipment having buffered data;
   code for establishing a limit which divides radio resources that are available for allocation in the plurality of the aggregated cells during a scheduling period into at least a first limited portion of the radio resources and a second remaining portion of the radio resources; and
   code for allocating, according to the determined relative priorities:
   a) the first limited portion of the radio resources from the first cell to only the data radio bearers that have a guaranteed bit rate, and thereafter
   b) from the other aggregated cells, the remaining portion of the radio resources to only the data radio bearers that have a guaranteed bit rate and which have not been fully allocated from the first limited portion of the previous aggregated cells;

c) the second remaining portion of the radio resources from each of the plurality of the cells to only the data radio bearers which have not been fully allocated from the first limited portion.

16. The computer readable memory according to claim 15, wherein
the relative priorities for data radio bearers in different ones of the plurality of carrier aggregated cells which are associated with a given carrier-aggregated user equipment are determined separately for each of the plurality of cells.

17. The computer readable memory according to claim 15, wherein:
the radio resources allocated in a first one of the carrier aggregated cells during the scheduling period to one of the data radio bearers having a guaranteed bit rate handles less than a total amount of the buffered data for the user equipment associated with the respective data radio bearer, in which the given user equipment associated with the respective data radio bearer is configured for carrier aggregation in the scheduling period across at least a second one of the carrier aggregated cells; and
the radio resources allocated in at least the second one of the carrier aggregated cells during the scheduling period to at least one further data radio bearer associated with the given user equipment are sufficient to meet the guaranteed bit rate for a total amount of the buffered data for the given user equipment.

18. The computer readable memory according to claim 15, wherein:
the data volume for each of the data radio bearers having a guaranteed bit rate is determined using the guaranteed bit rate; and
the data volume for each of the data radio bearers not having a guaranteed bit rate is determined using a minimum bit rate associated the respective data radio bearer.

19. The computer readable memory according to claim 18, wherein:
the data volume for each of the data radio bearers having a guaranteed bit rate indicates a total number of bytes, at the guaranteed bit rate of the respective data radio bearer, that may be scheduled on the respective data radio bearer over the scheduling period; and
the data volume for each of the data radio bearers not having a guaranteed bit rate indicates a minimum number of bytes, at the minimum bit rate for the respective data radio bearer, that must be scheduled on the respective data radio bearer over the scheduling period.

20. The computer readable memory according to claim 15, wherein the relative priorities of the plurality of data radio bearers are determined separately for each of the plurality of cells in a weighted fashion using at least:
priority of the data radio bearers as configured by a network control plane;
packet delay requirements;
channel quality; and
buffer occupancy of the respective user equipment associated with the respective data radio bearer.

* * * * *